United States Patent Office 3,442,950
Patented May 6, 1969

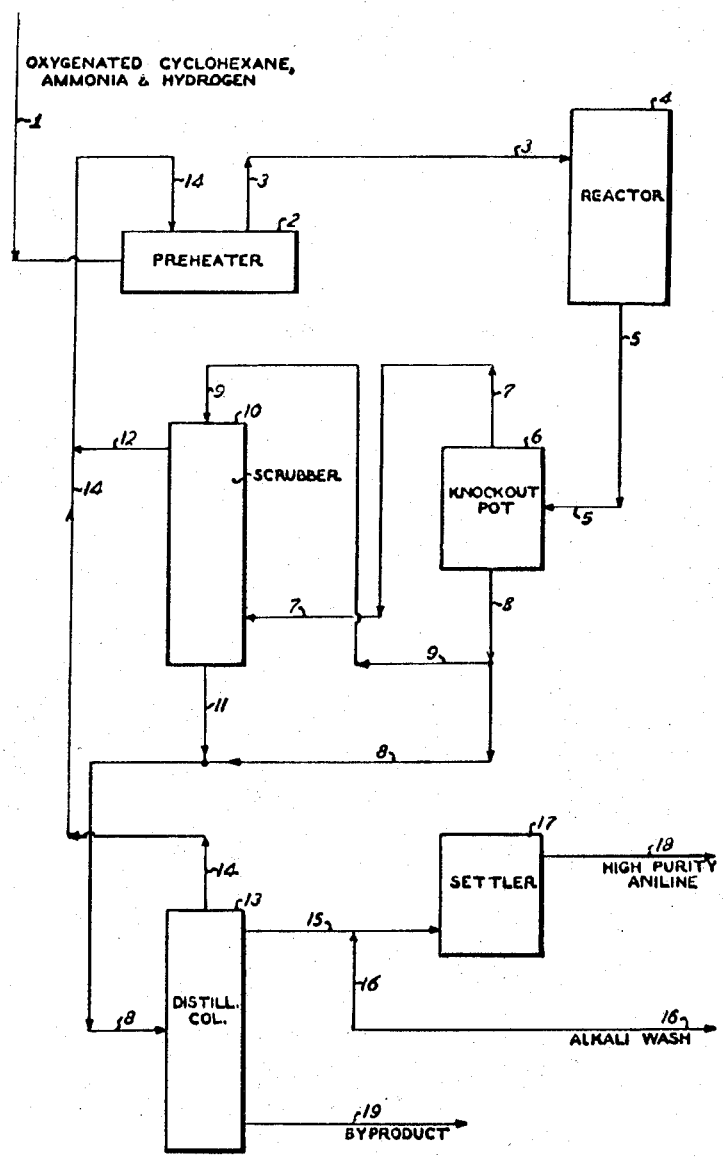

3,442,950
PROCESS FOR PREPARING AN
AMINATED BENZENE
Robert S. Barker, Little Ferry, N.J., assignor to Halcon International, Inc., a corporation of Delaware
Continuation-in-part of application Ser. No. 201,125, June 8, 1962. This application Feb. 16, 1967, Ser. No. 616,686
Int. Cl. C07c 85/04, 87/50
U.S. Cl. 260—576
2 Claims

ABSTRACT OF THE DISCLOSURE

Aminated benzenes are prepared by catalytically reacting a cyclohexanol with an aminating agent at elevated temperatures. When the cyclohexanol is a constituent, together with cyclohexanone, of an oxygenated cyclohexane, the reaction takes place in the presence of an initially added quantity of hydrogen.

RELATED APPLICATION

The present application is a continuation-in-part of copending application Ser. No. 201,125, filed June 8, 1962, now abandoned.

BACKGROUND OF THE INVENTION

Aminated benzenes are commercial chemicals of great industrial importance. For example, the varied uses of the simplest aminated benzene, aniline, include application as a rubber accelerator, antioxidant, dye intermediate, drug intermediate, explosive and fuel. Conventionally, aniline is prepared by the reduction of nitrobenzene with iron filings or borings with 30% hydrochloric acid; by reaction of chlorobenzene with aqueous ammonia at 200° C. and 800 p.s.i.; or catalytic vapor phase reduction of nitrobenzene with hydrogen.

Cyclohexane and substituted cyclohexanes, e.g., methyl cyclohexane, are commercially available raw materials which are readily oxidized to form oxygenated derivatives comprising cyclohexanols and cyclohexanones. The possibility of converting a cyclohexanol or an oxygenated cyclohexane comprising cyclohexanol and cyclohexanone to an aminated benzene offers a commercially attractive method which, however, has not heretofore been technically feasible. In the prior art, attempts to convert cyclohexane, or substituted cyclohexane, oxidation products to aminated benzenes were unsuccessful. For example, Ullman reports in Encyclopadie der Tech. Chem 5, 681 (1954), that the reaction of cyclohexanol and ammonia yields cyclohexylamine, rather than aniline.

Accordingly, it is an object of the present invention to provide a process for preparing an aminated benzene from a cyclohexanol or mixtures comprising a cyclohexanol and a cyclohexanone. A further object is to produce an aminated benzene in high yields. Another object is to produce aniline in high yields from an oxygenated cyclohexane comprising cyclohexanol and cyclohexanone. These and other objects of the present invention will become apparent from the following description.

BRIEF SUMMARY OF THE INVENTION

It has now been found that an aminated benzene can be prepared from a cyclohexanol by catalytically reacting a cyclohexanol with an aminating agent at elevated temperatures of from 250° C. to about 500° C. When the cyclohexanol is a constituent, together with cyclohexanone, of an oxygenated cyclohexane, the reaction is initiated in the presence of about 1 mole of hydrogen per mole of cyclohexanone in the oxygenated cyclohexane.

DETAILED DESCRIPTION

The cyclohexanol may consist of cyclohexanol, and alkyl or aryl substituted cyclohexanols in which one or more ring hydrogen atoms are replaced by an aliphatic or aromatic hydrocarbon group, or both, such as, for example, the isomeric methyl cyclohexanols, the isomeric dimethyl cyclohexanols, the isomeric ethyl cyclohexanols, the isomeric methyl ethyl cyclohexanols, the isomeric methyl diphenyl cyclohexanols, etc.

In a preferred embodiment of the present invention, the cyclohexanol is obtained by oxidizing a cyclohexane or an alkyl or aryl substituted cyclohexane in which one or more ring hydrogen atoms are replaced by an aliphatic or aromatic hydrocarbon group, or both, such as, for example, the cyclohexanes corresponding to the abovementioned cyclohexanols. In such cases, the oxygenated cyclohexane comprises both a cyclohexanol and a cyclohexanone. The oxidation of the cyclohexane is carried out under known conditions.

The "aminating agents" which are applicable to the instant invention include ammonia and hydrocarbon substituted primary amines, suitable alkylamines include methylamine, ethylamine, diethylamine, propylamine, isopropylamine, butylamine, sec-butylamine, t-butylamine, amylamine, 2-ethylhexylamine, octylamine, t-octylamine, sec-octylamine, decylamine, and hexadecylamine. Useful primary aromatic amines are aniline, 2,6-dimethylaniline, o-toluidine, m-toluidine, p-toluidine, p-butylaniline, p-decylaniline, p-dodecylaniline, alpha-naphthylamine, beta-naphthylamine, 2,3-xylidine, mesidine, 2-furanamine, xenylamine, p-phenetidine, p-anisidine, p-butoxylaniline, 3,4-dimethoxylaniline, p-ethylaniline, p-phenoxylaniline, p-cyclohexylaniline, and p-benzylaniline. Preferably, the hydrocarbon radical should contain from 1 to 10 carbon atoms.

The reaction conditions are of particular importance. Failure to maintain the proper conditions results in a failure to produce the aminated benzene and may also result in the destruction of the starting material. The appropriate reaction temperatures are from about 250° C. to about 500° C., and preferably from about 285° C. to about 350° C.

The total process may be carried out at pressures of from subatmospheric to as high as 1000 p.s.i.g. Partial pressures of the oxygenated cyclohexane, hydrogen and aminating agent are particularly significant. These partial pressures can be conveniently expressed in terms of mole percent fed into the reaction. The precursor, i.e., the oxygenated cyclohexane, should be present in a concentration of from about 0.2 to about 25 mole percent, preferably from about 2 to about 15 mole percent. From about 1 to about 99 mole percent of hydrogen should be present, preferably from about 5 to about 80%, and, most preferably, from about 10 to about 50 mole percent. The quantity of initially added hydrogen on a molar basis is at least equal to, and preferably in excess of the molar quantity of the cyclohexanone in the oxygenated cyclohexane. The concentration of the aminating agent should be at least 1 mole per mole of the oxygenated cyclohexane, although some desired product will be obtained with less than 1 mole of aminating agent. Most satisfactory operation is obtained with at least 2 moles of the aminating agent present. The aminating agent may be conveniently recycled and built up in the reactor without detriment.

The process of the present invention may be carried out by passing the cyclohexanol into a reaction zone at a liquid hourly space velocity (LHSV) of from about 0.1 to about 25 hr.$^{-1}$ together with an aminating agent, the latter being present in a molar ratio at least equal to that of the cyclohexanol. When the starting material is an oxygenated cyclohexane, the reaction mixture initially contains at least about 1 mole of hydrogen per mole of cyclohexanone in the oxygenated cyclohexane, and preferably about 5 moles or more.

The reaction may be carried out in the presence of a catalyst which is a metal of Group VIII of the Periodic Table, or mixtures of two or more of such metals, such as the metals of the platinum group, or the palladium group as well as cobalt and nickel. Copper, molybdenum, chromium or mixtures of these metals with each other or with any of the Group VIII metals may also be used as the catalyst.

Best yields are obtained using a catalyst supported on neutral materials, such as carbon, silica, silicon carbide or alpha-alumina of the porous type. Self-supporting catalysts such as the "foraminates" may be employed. These catalysts are described in detail in Groggins, Unit Processes in Organic Synthesis, McGraw-Hill Book Co. Inc. (New York), 1958, vol. 5, pages 434–438.

The following table will aid in understanding how the product obtained varies with changes in the selected starting materials.

TABLE

| Oxygenated cyclohexane | Aminating agent | Aminated benzene |
|---|---|---|
| (1) Cyclohexanol | Ammonia | Aniline. |
| (2) Methylcyclohexanol | do | Methyl aniline (toluidine). |
| (3) Cyclohexanol | Methyl amine | N-methyl aniline. |
| (4) Methyl cyclohexanol | Aniline | Methyl diphenylamine. |

The above examples do not necessarily include all of the aminated benzenes produced from the particular starting materials. For example, in reaction 1 the aniline produced as the reaction proceeds may also serve as an aminating agent and react with the cyclohexanol to form diphenylamine. Since the catalyst employed can function as a dehydrogenation catalyst, carbazole is also formed, and, under appropriate circumstances, may also be a major product. Of course, the invention is not to be construed as limited to the particular mechanism by which the reaction products are formed.

To further illustrate the invention attention is directed to the attached figure. An oxygenated cyclohexane comprising cyclohexanol and cyclohexanone, ammonia and hydrogen are fed to preheater 2 via line 1. This feed plus the recycle streams, hereinafter described, are preheated to 250° C. and pass to the reactor 4 through line 3. A suitable reactor is an iron pipe 1″ in diameter and 3′ long. The reactor feed stream in line 3 contains oxygenated cyclohexane, ammonia and hydrogen in a molar ratio of 1:10:10. In reactor 4 the feed passes over a platinum on carbon catalyst at a space velocity of 4000 hours at 315° C. and atmospheric pressure. The reaction product leaves the reactor 4 through line 5 and passes to knockout pot 6. Hydrogen and ammonia are removed overhead through line 7 and liquid drains out through line 8. A portion of this liquid passes through line 9 to the cooled scrubber wherein the hydrogen and ammonia are stripped of entrained liquid. The scrubber liquid returns via line 9 to line 8 and the scrubbed hydrogen and ammonia recycles via line 12 to preheater 2. The liquid product passes to distillation column 13 at a temperature of 100° C., the unreacted cyclohexanol and cyclohexylamine is removed via line 14 and recycles. The second overhead product, at a temperature of 180–185° C., leaves the distillation column 13 through line 15 and is washed with alkali through line 16 to remove trace quantities of phenol. The mixture settles in settler 17 and high purity aniline removed via line 18. A byproduct of the reaction is removed as a bottom product of the distillation column 13 via line 19 and contains primarily dicyclohexylamine, diphenylamine and carbazole.

The following examples further show the practice of the instant invention:

Example 1

A platinum-on-carbon catalyst is soaked in an excess of 0.1 N NaOH and washed until the pH of the washings is about 7.5. The catalyst is then placed in the reactor and treated from 150° C. to 300° C. with a slow stream of $H_2$. A mixture containing ammonia, hydrogen, cyclohexanol and cyclohexanone in molar ratio of 16:1:1:0.2 is passed over the catalyst at 315° C. and 12 p.s.i.g. at a LHSV of 0.5. The cyclohexanol-cyclohexanone conversion is 100%. The effluent after removal of water contains 89% aniline, 5% cyclohexylamine, 5% benzene and 1% high boilers.

Example 2

A palladium-on-silica gel catalyst is used as in Example 1. Methylamine is passed with $H_2$ and cyclohexanol in a molar ratio of 5:5:1 over the catalyst at 330° C. to give N-methyl aniline in 70% yield.

What is claimed is:

1. A process for preparing an aminated benzene which comprises reacting cyclohexanol or a lower alkyl or phenyl substituted cyclohexanol and as an aminating agent ammonia or primary amines at a temperature of from about 250° C. to about 500° C. in the presence of a catalyst selected from the group consisting of platinum, palladium, cobalt, nickel, copper, molybdenum, chromium and mixtures thereof, the reaction being carried out at pressures up to 1000 p.s.i.g. and at liquid hourly space velocities of cyclohexanol of from 0.1 to 25 hr.$^{-1}$, the aminating agent being present in at least molar amount equal to the cyclohexanol.

2. A process according to claim 1 wherein the temperature is from about 285° C. to about 350° C.

References Cited

UNITED STATES PATENTS 3,219,702  11/1965  Van Verth et al. ___ 260—576 X
3,219,704  11/1965  Wilder et al. _____ 260—576

CHARLES B. PARKER, *Primary Examiner.*

P. C. IVES, *Assistant Examiner.*

U.S. Cl. X.R.

260—577, 578, 581